Aug. 3, 1965 R. A. GRAY, JR 3,198,211
MULTI-WAY VALVE UNIT HAVING PARTICULAR O-RING
VALVE AND SEAT STRUCTURE
Filed March 30, 1962
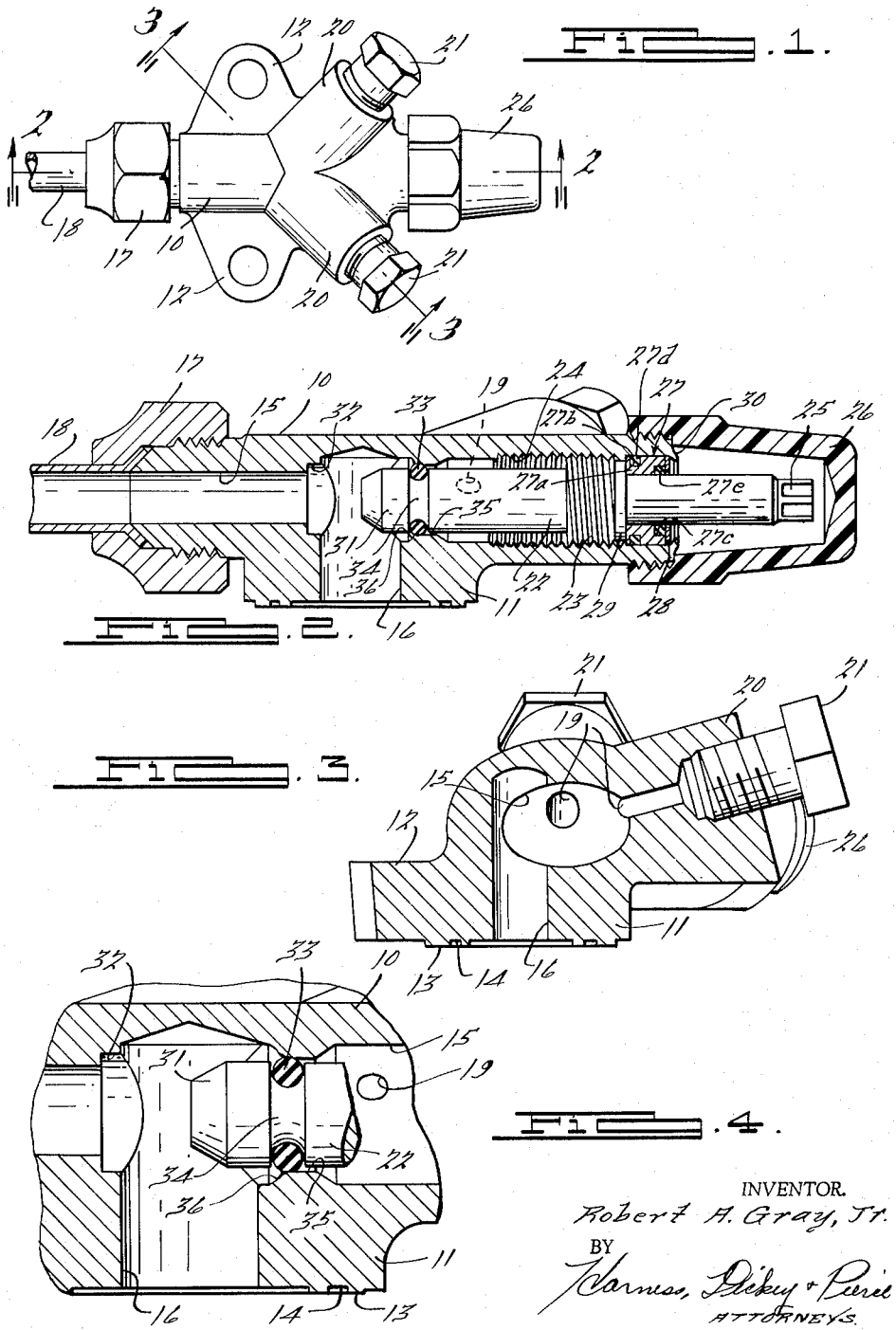
INVENTOR.
Robert A. Gray, Jr.
BY
Harness, Dickey & Pierce
ATTORNEYS.

United States Patent Office 3,198,211
Patented Aug. 3, 1965

3,198,211
MULTI-WAY VALVE UNIT HAVING PARTICULAR O-RING VALVE AND SEAT STRUCTURE
Robert A. Gray, Jr., Port Huron, Mich., assignor to Mueller Brass Co., Port Huron, Mich., a corporation of Michigan
Filed Mar. 30, 1962, Ser. No. 183,851
4 Claims. (Cl. 137—625.4)

This invention relates to compressor valves and more particularly to an improved compressor service valve adapted for attachment to the suction and discharge ports of the compressor of a refrigeration system.

Valves of this type are provided with one or more gauge and/or charging ports to which a pressure gauge or charging line may be attached. These ports, when not in use, are closed by plugs or caps. Such valves are provided with means for sealing these ports to allow removal of the plugs or caps for the attachment of the aforesaid service equipment while the refrigeration system is in operation, without a major loss of refrigerating fluid.

Heretofore conventional valves of this type required the use of a two-piece valve body, whereby the valve stem is inserted into the main body portion from the open end thereof opposite the cap end, and thereupon the second body portion is inserted into the main body portion to provide a conduit connecting means, and the two body portions are united by brazing or the like. This construction and method of assembling of prior valves was necessitated by the fact that a conventional valve stem requires the head or seating area of the valve stem, and the counterbore in the valve body against which the head seats, to be larger than the valve stem thread, to provide sufficient metal-to-metal contact when the parts are engaged, to seal the gauge and charging ports.

In this state of the prior art it is the principal object of this invention to provide a compressor valve of the type described in which the valve body may be formed in one piece and the valve stem installed from the cap end of the valve and still provide means for completely sealing the gauge and charging ports.

Another object of the invention is to provide a valve of this type in which the port sealing means is simple in construction, comprises a minimum of parts, and may be economically manufactured and easily assembled.

In accordance with this invention the port sealing means of the valve comprises essentially an O-ring type sealing member disposed in an annular groove in the valve stem and an inwardly extending annular ridge or shoulder constituting a valve surface on the inner surface of the valve body adapted for sealing engagement with said O-ring upon proper adjustment of the valve stem.

By making the valve body in one piece, the brazing operation required to unite and seal the two body portions of conventional valves is eliminated and the necessity for cleaning after brazing is avoided. Also, the requirement of machining two separate parts to provide the valve body is eliminated.

Various other objects and advantages and the novel details of construction of the present invention will become apparent from the following description, the appended claims and the accompanying drawings in which:

FIGURE 1 is a top view of a compressor valve constructed in accordance with this invention;

FIG. 2 is an enlarged longitudinal sectional view taken substantially on the plane indicated by line 2—2 in FIGURE 1;

FIG. 3 is an enlarged sectional elevational view taken substantially on the plane indicated by line 3—3 in FIGURE 1; and FIG. 4 is an enlarged detail sectional view of the port sealing valve.

Referring now to the drawings, the reference character 10 indicates the valve body which may be forged in one piece from brass, cast iron, or other suitable material. The valve body 10 is provided with a boss 11 provided with a pair of laterally extending ears or lugs 12 by means of which the flat face 13 of the boss 11 may be secured to either the suction port or discharge port of the compressor (not shown) of a refrigeration system. A gasket (not shown) is preferably disposed between the face 13 of the boss 11 and the compressor, the boss 11 also being provided with a circular recess 14 forming circular sealing edges for biting into the gasket at low torque applied to the valve mounting screws so as to provide a fluid-tight connection with the compressor.

The valve body 10 is provided with a chamber or passageway 15 extending longitudinally therethrough which is intersected by a lateral passageway 16 which is connected to the compressor.

The left-hand end of the valve body (as viewed in FIG. 2) is connected by a coupling 17 to a conduit 18 which may be either connected to the coil or be part of the suction line of the refrigeration system.

The valve body 10 is provided with one or more (here shown as two) gauge and/or charging ports 19 each provided with a tubular extension 20, the open ends of which are closed by removable plugs 21. The tubular extensions 20 are adapted to have attached thereto a pressure gauge or charging line or other service equipment.

An important feature of this invention is to provide means for sealing these ports to allow removal of the plugs 21 for the attachment of service equipment, such as a gauge or charging line, while the refrigerating system is in operation, without an appreciable loss of refrigerating fluid.

The reference character 22 indicates the valve stem having a threaded portion 23 adapted to engage the threaded portion 24 of the valve body, whereupon by rotation of the valve stem it may be adjusted longitudinally of the valve body. The end of the valve stem 22 extends beyonds the valve body and is provided with an irregularly-shaped portion 25 which may be engaged by a suitable hand wheel or tool (not shown) for rotating the valve stem. The exposed end of the valve stem is covered and enclosed by a plastic sealing cap 26 threadedly secured to the end of the valve body.

The shank of the valve stem 22 is tightly sealed within the valve body by means of a seal assembly 27 disposed in an annular recess at the end of the valve body as shown in FIGURE 2 and retained therein by means of a rolled-in edge 30 of the valve body. The seal assembly 27 comprises a stepped annular sleeve or collar 27a which is provided with a peripheral rectangular groove 27b and an internal rectangular groove 27c in which O-ring type seals 27d and 27e, respectively, are disposed and compressed so as to conform with the contour of the grooves 27b, 27c and the adjacent surfaces of the valve body and valve stem in contact therewith forming a liquid-tight seal therebetween. A flat washer 28 is disposed between the sleeve 27a and the rolled-in edge 30 of the valve body for preventing relative axial movement of the seal assembly and maintaining the O-ring type seal 27e adjacent thereto in appropriate compressed condition. In addition to providing an effective seal, the seal assembly 27 also serves as a positive stop restricting the outward axial movement of the valve stem in response to rotation thereof relative to the valve body. The outward axial movement of the valve stem is limited by the coaction of an annular shoulder 29 on the valve stem and the inward or left-hand edge of the stepped annular sleeve 27a providing a positive stop and in which position the charging ports 19 are sealed from the lateral passageway 16 in accordance with valve means hereinafter described.

It is also contemplated within the scope of the present invention that conventional molded type valve packings and packing glands can be employed for forming a satisfactory liquid pressure-tight seal between the valve stem and valve body in lieu of the seal assembly 27 shown in FIGURE 2.

The inner end of the valve stem 22 is provided with a valve member 31 adapted to engage a counterbored portion 32 formed in the chamber or passageway 15 of the valve body 10 at the juncture of the lateral passage 16 which is connected to the compressor. When the valve member 31 engages the counterbore or valve seat 32, communication between the compressor and the coil or suction line through conduit 18 is cut off.

Means for sealing the gauge and charging ports comprises an O-ring type sealing member 33 disposed in an annular groove 34 formed in the valve stem 22. This O-ring seal 33 is adapted for sliding or rolling engagement with the crest or inner surface of an inwardly extending annular rib, ridge or shoulder 35 formed on the inner surface of the valve chamber. The crest or inner surface of this rib constitutes a valve surface. The juncture of the rib 35 with the valve body at one side is provided with a rounded or concave surface or fillet 36, to provide a smooth or nonabrupt approach, so that as the O-ring rolls up or slides onto the valve surface 35 it will not be cut or otherwise mutilated.

In assembling the valve, the valve stem 22 may be inserted into the valve body from the open right-hand end as viewed in FIGURE 2, because the diameter of the O-ring 33 is less than that of the valve-stem threads 23. After the valve-stem threads 23 have been engaged with the threads 24 and the valve body, the seal assembly 27 is placed in position as illustrated in FIGURE 2 and the end of the valve body is swaged or rolled inwardly against the washer 28 to form the turned-in edge 30 to secure the seal assembly and valve stem in place.

With the O-ring 33 in engagement with the valve surface 35, as shown in FIGURES 2 and 4 and in which position the shoulder 29 on the valve stem is positioned in a stopped condition against the seal assembly 27, the ports 19 are sealed from the remainder of the refrigerating system so that the plugs 21 may be removed for attachment of any service equipment such as a pressure gauge or a charging line, without material loss of refrigerating fluid even though the refrigeration system is still in operation.

It will be understood that by reason of the construction just described, the previously described objects and advantages of the invention are readily obtained. The invention contemplates the provision of one or two ports 19 and corresponding tubular extensions 20. It has been found that if two of these ports 19 are provided, attachment of the service equipment may be made with one or the other of the tubular extensions, depending upon which one is the most accessible.

While one form of the invention has been described and illustrated in detail, it will be understood that various changes may be made as may come within the purview of the accompanying claims.

What is claimed is:

1. A compressor valve for a refrigeration system comprising, a valve body defining a valve chamber having at least one outlet port and at least one service port longitudinally spaced from said outlet port for attachment to service equipment, said valve body being formed in one piece and having an open end, an inwardly extending annular rib on the surface of said valve chamber disposed between said outlet and said service port and forming a valve surface, a valve stem provided with a threaded portion for engagement with a threaded portion in said valve chamber for longitudinal movement of the valve stem in said valve chamber, an annular groove on said valve stem adjacent the inner end thereof, and an O-ring sealing member mounted in said groove for engagement with said valve surface in one position of said valve stem to close communication between said service port and said outlet port, the side of said rib between said valve surface thereof and the juncture with the valve chamber wall being rounded to provide a smooth approach for the O-ring and resilient compression thereof from an expanded diameter in which at least a portion of its periphery projecting beyond said valve stem is engaged by at least a portion of the rounded said side of said rib to a compressed diameter as it is moved into engagement with said valve surface, the expanded diameter of the O-ring being less than the diameter of the valve stem threads to permit assembly of the parts by inserting the valve stem into the said open end of the valve body.

2. A compressor valve for a refrigeration system comprising, a valve body defining a valve chamber having at least one outlet port and at least one service port longitudinally spaced from said outlet port for attachment to service equipment, said valve body being formed in one piece and having an open end, an inwardly extending annular rib on the surface of said valve chamber disposed between said outlet and said service port and forming a valve surface, a valve stem provided with a threaded portion for engagement with a threaded portion in said valve chamber for longitudinal movement of the valve stem in said valve chamber, an annular groove on said valve stem adjacent the inner end thereof, an O-ring sealing member mounted in said groove for engagement with said valve surface in one position of said valve stem to close communication between said service port and said outlet port, the side of said rib between said valve surface thereof and the juncture with the valve chamber wall being rounded to provide a smooth approach for the O-ring and resilient compression thereof from an expanded diameter in which at least a portion of its periphery projecting beyond said valve stem is engaged by at least a portion of the rounded said side of said rib to a compressed diameter as it is moved into engagement with said valve surface, the expanded diameter of the O-ring being less than the diameter of the valve stem threads to permit assembly of the parts by inserting the valve stem into the said open end of the valve body, combination sealing means and stop means for sealing said valve stem in said valve body, said sealing means comprising a tubular sleeve formed with a peripheral groove and an internal groove therearound and in which O-ring seals are disposed for contacting the valve body and valve steam respectively forming a pressure-tight seal therebetween, an annular shoulder on said valve stem adapted to engage said sleeve limiting the outward axial movement thereof, and a turned-in edge at the end of said valve body for securing said sealing means and said valve stem in place.

3. A valve comprising an integral body having an open end and formed with an elongated chamber extending inwardly from one end thereof, said chamber formed with at least one outlet port and with at least one service port longitudinally spaced from said outlet port, said chamber including an inwardly extending annular rib disposed between said outlet and said service port forming therewith a valve surface, a valve stem extending into and threadably disposed in said chamber for longitudinal movement to and from a first position and a second position, means on said valve stem for closing communication between said outlet port and said chamber when said stem is in said first position, resilient sealing means around said stem for sealingly engaging said valve surface when said stem is in said second position for closing communication between said service port and said outlet port, the side of said rib between said valve surface thereof and the juncture with the chamber wall being of progressively decreasing diameter to provide a smooth approach for said sealing means and resilient compression thereof from an expanded diameter in which at least the peripheral portion of said sealing means is engaged by at least a portion of said side of said rib to a compressed diameter as said stem is moved toward said second position, said expanded diameter of said sealing means being less than the diameter of said chamber to permit assembly of the parts by inserting said stem into the open end of said body.

4. A valve comprising an integral body having an open end and including a bore extending inwardly from one surface thereof and formed with an inwardly extending annular rib defining a valve surface and separating said bore into a first chamber and a second chamber, said body formed with at least one outlet port disposed in communication with said first chamber and at least one service port disposed in communication with said second chamber, a valve stem threadably disposed in said bore and longitudinally movable therein to and from a first position and a second position, said valve stem including means thereon for closing communication of at least one of said outlet ports with said first chamber when said stem is in said first position, resilient sealing means around said stem adapted to sealingly engage said valve surface for closing communication between said first and said second chambers when said stem is in said second position, the side of said rib between said valve surface thereof and the juncture with the wall of said first chamber being of progressively decreasing diameter to provide a smooth approach for said sealing means and resilient compression thereof from an expanded diameter in which at least the peripheral portion of said sealing means is engaged by at least a portion of said side of said rib to a compressed diameter as said valve stem is moved toward said second position, said expanded diameter of said sealing means being less than the diameter of said bore to permit assembly of the parts by inserting said valve stem into the open end of said body.

References Cited by the Examiner
UNITED STATES PATENTS

| | | | |
|---|---|---|---|
| 2,209,709 | 7/40 | Weatherhead | 137—625.5 XR |
| 2,578,797 | 12/51 | Gardinier | 251—239 |
| 2,782,800 | 2/57 | Hillebrand | 251—333 XR |
| 3,012,570 | 12/61 | Gibiser | 137—625.25 XR |
| 3,012,571 | 12/61 | Castillo | 137—625.25 XR |

ISADOR WEIL, *Primary Examiner.*